May 6, 1958  W. P. OEHLER ET AL  2,833,440
REVERSIBLE HOPPER LID FOR AGRICULTURAL IMPLEMENTS
Filed Dec. 31, 1956
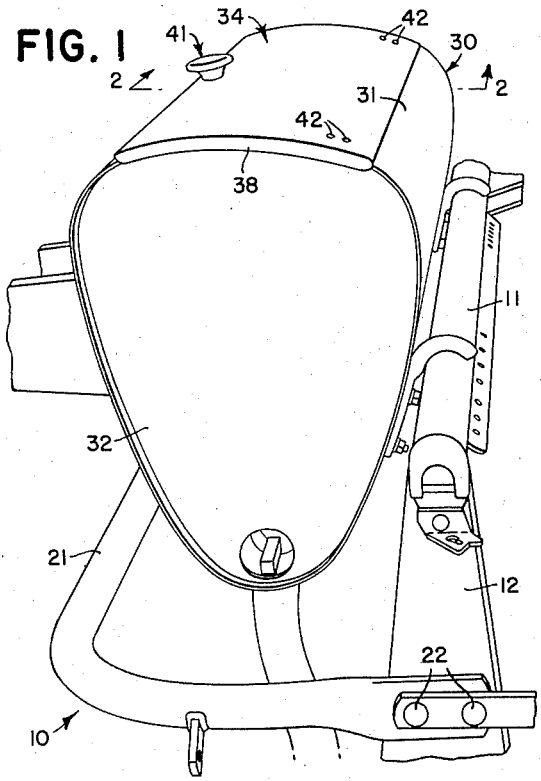
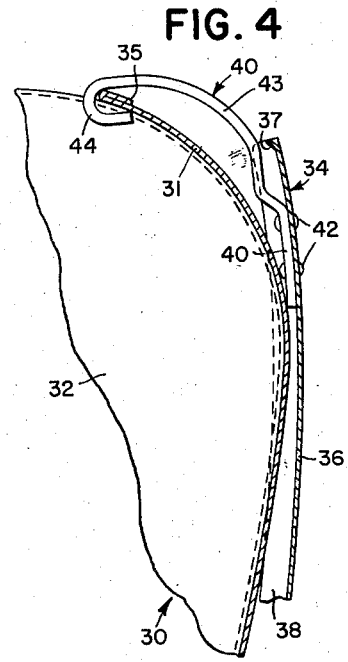
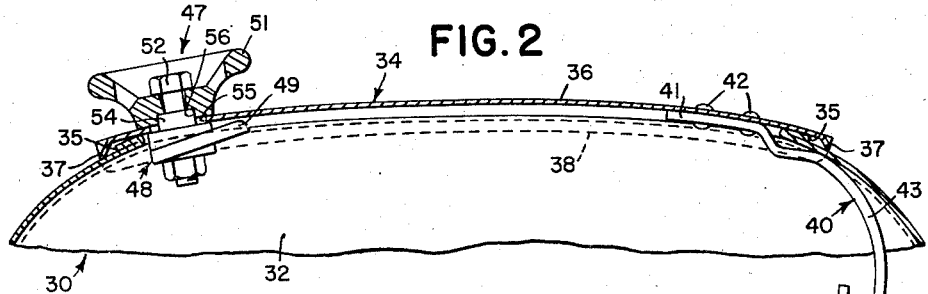
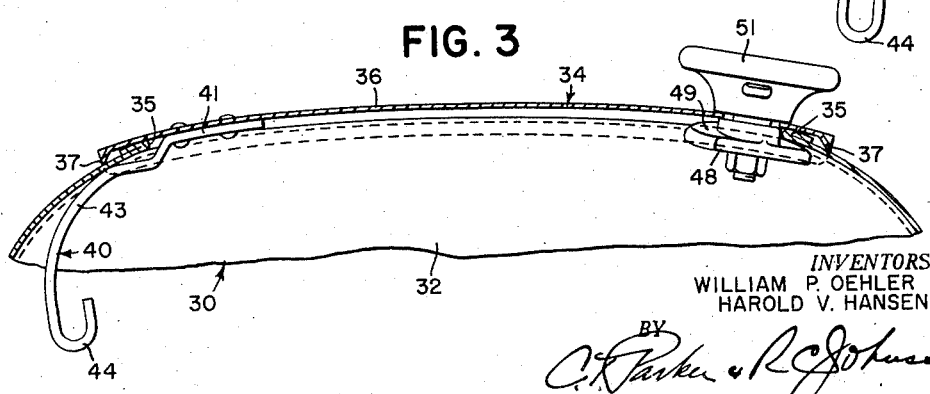
INVENTORS.
WILLIAM P. OEHLER
HAROLD V. HANSEN
ATTORNEYS

United States Patent Office 2,833,440
Patented May 6, 1958

2,833,440

REVERSIBLE HOPPER LID FOR AGRICULTURAL IMPLEMENTS

William P. Oehler, Moline, and Harold V. Hansen, Hillsdale, Ill., assignors to Deere & Company, Moline, Ill., a corporation of Illinois Application December 31, 1956, Serial No. 631,952

6 Claims. (Cl. 220—55)

The present invention relates generally to agricultural implements and more particularly to fertilizer distributors and other implements including hoppers containing material to be dispensed by suitable mechanism.

The object and general nature of the present invention is the provision of a new and improved hopper construction particularly adapted for farm use and especially constructed and arranged so that the hopper may be filled either from the front or from the rear. More specifically, it is a feature of this invention to provide a reversible hopper lid construction with new and improved means for securing the hopper lid or cover in either of its positions, and an additional feature of this invention is the provision of means associated with the lid holding means for supporting the hopper lid on either one side or the other of the hopper and entirely below the filler opening, leaving the latter exposed and accessible to the operator so as to facilitate filling the hopper from either side.

Further, an additional feature of this invention is the provision of a reversible hopper lid arrangement in which, along one side of the lid the latter is provided with clips or the like adapted to engage underneath the edge of the associated portion of the hopper opening, and means at the other side of the hopper lid, also adapted to engage underneath the associated portion of the edge of the hopper opening, for holding the lid in position closing the filler opening of the hopper, and still further, it is a feature of this invention to arrange such means to accommodate reversal of the hopper lid on the hopper whereby the latter may readily be removed and attached, as desired, from either side of the hopper.

These and other objects and advantages of the present invention will be apparent to those skilled in the art after a consideration of the following detailed description, taken in conjunction with the accompanying drawings, in which:

Fig. 1 is a fragmentary perspective view of a portion of an agricultural implement having a fertilizer hopper in which the principles of the present invention have been incorporated.

Fig. 2 is a sectional view taken generally along the lines 2—2 of Fig. 1.

Fig. 3 is a sectional view similar to Fig. 2 but showing the reversed or opposite position of the hopper lid.

Fig. 4 is a fragmentary sectional view showing the mounting of the hopper lid on the sides of the hopper so as to expose and make accessible, as for filling, the filler opening of the hopper.

The principles of the present invention have been invited, for purposes of illustration, in a planter that includes a main frame 10 which includes an upper sill bar, preferably in the form of a pipe, a pair of vertical end sections 12, and a lower transverse forwardly disposed member, also a pipe, shown at 21. The end portions of the latter member are bent rearwardly and fastened, as at 22, to the lower portions of the end sections 12. The frame 10 carries a pair of hoppers 30, only one of which is shown in the drawings, and each hopper includes a hopper sheet 31 that is rolled to fit generally oval-like end plates 32. As best shown in Fig. 2, the upper edges of the formed hopper sheet 31 are turned back and spaced apart to form an upper hopper opening that is adapted to be closed by a hopper cover or lid indicated in its entirety by the reference numeral 34. The turned back edges of the hopper sheet are indicated at 35 in Figs. 2, 3 and 4.

The hopper cover, which forms the principal portion of the present invention, is of special construction, so arranged that it can be reversed end for end and easily and positively secured in place on the hopper in either position. This facilitates the disconnection of the cover or lid from either side of the hopper, which is a desirable feature since this makes it easy and convenient to fill the hopper from either side, either from an adjacent truck which can be backed into position from either the front or the rear of the planter, or by lifting sacks of fertilizer into position from either the front or rear of the planter, the hoppers 30 being mounted on the planter in a relatively low position to facilitate this action.

As is shown best in Figs. 2 and 3, the hopper cover 34 comprises a cover panel 36 having its front and rear edges turned down at about 45°, as indicated at 37, and the end edges of the panel 36 are also turned down at about 90°, to form end flanges 38. The hopper is of such length that, as best shown in Fig. 1, the end flanges 38 embrace the end of the hopper at the upper portions thereof. At one side of the panel 36, the hopper cover or lid is provided with a pair of hook members 40, each having a base section 41 that is secured, as by rivets 42, to the panel 36, and lid-retaining sections 43 that are spaced generally below and slightly outwardly of the adjacent edge 35 of the hopper cover. The retaining section 43 is further extended, as at 44, to provide lid-supporting hook sections which will be referred to later in detail. At the other side of the cover panel 36, the hopper lid carries a cam-like latch indicated in its entirety by the reference numeral 47. This latch is disposed, as best shown in Fig. 1, generally midway between the cover retaining members 40 but, of course, at the other side of the lid. The latch means 47 includes a lower cam member 48 having an inclined section 49, and an upper knob 51, both the members 48 and 51 being interconnected by a bolt 52 or other similar or equivalent fastener. As best shown in Fig. 2, the lower or latch cam 48 is provided with a generally square section 54 that is extended outwardly through an opening 55 in the cover panel 36 and is rotatable therein. The squared portion 54 seats non-rotatably in a square socket section 56 that is formed in the knob member 51, whereby, when the bolt 52 is tightened, the members 48 and 51 are rigidly interconnected so that when the assembly is turned relative to the cover, the high portion of the cam 49 is brought underneath the adjacent edge of the hopper opening, which is a position shown in Fig. 3, so as to secure the hopper cover in place. It will be noted in this connection that the two retaining members 40 are so formed that they also engage underneath the adjacent edge of the hopper. Thus, the retaining means and the releasable latch means are both carried by the hopper cover and both engage underneath the adjacent edges of the hopper opening. The hopper, in effect, is generally symmetrical about a vertical plane, at least in the upper portions thereof, and therefore, when the hopper cover is placed in a reversed position, as shown in Fig. 3, as compared with Fig. 2, the retaining parts 40 engage under the front side of the hopper while the releasable latch 47 engages, in the locked position, under the rear side of the hopper.

When filling the hoppers, it is, of course, desirable to have the covers or lids entirely out of the way in filling operation, and yet it is also desirable to have the covers available for immediate reinstallation after the filling has been completed. To this end, the retaining members 40, as mentioned above, are provided with hook extensions 44. These sections are so constructed, as shown in Figs. 2 and 3, that while in the closed position the hook sections 40 lies relatively closely underneath the adjacent side of the hopper, as shown in Fig. 3, for example, but by releasing the latch 47 and lifting the adjacent edge of the hopper lid upwardly a small amount, the hopper lid may then be slid across the hopper opening and into the position shown in Fig. 4, without having to lift the entire weight of the lid. When the two hook sections 44 are engaged over the edge portions, either front or rear, of the hopper, the lid or cover lies closely against the adjacent side of the hopper in a substantially completely out of the way position so as to not interfere with the filling of the hoppers.

After the hopper is filled the lid or cover may be replaced with the same ease and convenience. By grasping the lower edge of the hopper cover, and then pulling outwardly a relatively small amount, the hopper cover can then easily and conveniently be slid upwardly and forwardly (or rearwardly, depending upon whether the hopper cover or lid is supported on the front or rear side of the hopper) and over the hopper opening until the retaining sections or clips 43 engage the underside of the far edge of the hopper opening. After this, the other edge of the hopper cover may be lowered into position and then the latch 47 turned to effectively lock the cover in position. It will be noted that the particular shape of the hook sections 44 provide not only for the close and snug support of the hopper lid in the open hopper position but also these portions serve to guide the retaining sections 43 into position when sliding the hopper lid up and over onto the hopper opening.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. In a hopper having an upper opening, a cover therefor comprising a lid having a securing part engageable with the underside portion of the hopper adjacent said opening to aid in holding the lid over said opening, and an extension on said part formed as a hook adapted to engage over an edge of said opennig and hold said lid on the hopper with said opening exposed.

2. In a hopper having an upper opening, a cover therefor comprising a lid having a pair of securing parts on the underside of said cover at opposite marginal portions thereof, each having a portion extensible outwardly of said cover and constructed to engage the underside portion of the hopper at opposite sides of the hopper so as to hold the lid over said hopper opening, and an extension on one of said parts formed as a hook adapted to engage over an edge of said opening and hold said lid on the hopper with said opening exposed and with the cover below said opening so as not to interfere with the filling of the hopper.

3. In a fertilizer distributor or the like, an elongated hopper having a filler opening extending along the top of the hopper and adapted to be filled from either the front or the rear of the hopper, optionally, an elongated hopper lid adapted to cover said opening and reversible end for end relative to the hopper, said hopper adjacent said filler opening being substantially symmetrical in cross section, a pair of clips spaced apart along the hopper lid and fixed to the lid adjacent one edge and each being spaced from the lid so as to engage the underside of associated edge portion of the hopper in either position of the lid over the hopper opening, a locking part movably mounted on the lid adjacent the other edge thereof and disposed generally midway between said clips, said locking part including a hopper-engaging section at the underside of the lid and arranged to engage the underside of associated edge portion of the hopper in either position of the lid over the hopper opening, and a hook extension on each of said clips arranged to support the lid on either of the hopper edge portions, with the lid disposed close against the associated side of the hopper and below the filler opening.

4. In a fertilizer distributor or the like, a hopper having a filler opening at the top, opposite edge portions thereof being symmetrical, a reversible hopper lid constructed and arranged to cover said opening and having adjacent one side a member adapted to engage under one or the other of said hopper edge portions, a releasable latch member carried by said lid adjacent the other side thereof and constructed and arranged to engage under said other or said one of said hopper edge portions, depending on whether the hopper lid is placed on the hopper in one position or the other, and a hook formed on said hopper engaging member at the laterally outer portion, said member and said hook being shaped so that when the hopper lid is removed from said filler opening and the hook engaged over either of said hopper edge portions, the lid is supported on the hopper closely adjacent the associated side of the hopper with the filler opening accessible for filling or the like.

5. In a fertilizer distributor or the like, a hopper having a filler opening at the top, a hopper lid constructed and arranged to cover said opening and having adjacent one side a member adapted to engage under one edge of said hopper opening, a releasable latch member carried by said lid adjacent the other side thereof and constructed and arranged to engage under the other edge of said hopper opening, and a hook formed on said hopper engaging member at the laterally outer portion, said member and said hook being shaped so that when the hopper lid is removed from said filler opening and the hook engaged over an edge of said hopper opening, the lid is supported on the hopper closely adjacent the associated side of the hopper with the filler opening accesible for filling or the like.

6. In a hopper having an upper opening, a cover therefor comprising a lid having a securing part engageable with the underside portion of the hopper adjacent said opening to aid in holding the lid over said opening, said securing part comprising a strap-like member fixed at one end to said cover, a portion adjacent said end being spaced away from said cover so as to form means adapted to underlie the adjacent edge of the hopper when the cover is disposed in place over the opening, and a portion bent backwardly toward said one end to serve as a hook adapted to engage over an edge of said opening and hold said lid on the hopper with said opening exposed.

References Cited in the file of this patent

UNITED STATES PATENTS

| 904,972 | Lauster | Nov. 24, 1908 |
| 1,597,902 | Kuck | Aug. 31, 1926 |
| 1,784,551 | Smith | Dec. 9, 1930 |

FOREIGN PATENTS

| 418,689 | Great Britain | Oct. 30, 1934 |